United States Patent [19]
Levrai et al.

[11] Patent Number: 5,172,964
[45] Date of Patent: Dec. 22, 1992

[54] VACUUM BOOSTER WITH ELECTROMAGNETIC VALVE CONTROL

[75] Inventors: Roland Levrai, Stains; Philippe Castel, Paris, both of France

[73] Assignee: Bendix Europe Services Techniques, Drancy, France

[21] Appl. No.: 740,250

[22] Filed: Aug. 5, 1991

[30] Foreign Application Priority Data

Sep. 28, 1990 [FR] France .............. 90 12016

[51] Int. Cl.⁵ .......................................... B60T 13/57
[52] U.S. Cl. ........................... 303/114.1; 60/545; 91/376 R; 303/114.3; 303/113.3
[58] Field of Search .......... 303/113 TR, 113 TB, 303/114 R, 114 PN, 113 SS; 188/356, 357; 60/545, 547.1; 91/376 R, 369.4, 369.2

[56] References Cited

U.S. PATENT DOCUMENTS

| | | | |
|---|---|---|---|
| 3,795,426 | 3/1974 | Sisson | 303/21 |
| 3,800,666 | 4/1974 | Kasselman | 91/376 |
| 4,608,825 | 9/1986 | Fontaine | 60/545 |
| 4,712,468 | 12/1987 | Blot | 91/376 R |
| 4,819,996 | 4/1989 | Belart et al. | 303/114 PN |

FOREIGN PATENT DOCUMENTS

| | | | |
|---|---|---|---|
| 0149856 | 8/1984 | Japan | 303/114 R |
| 2234026 | 1/1991 | United Kingdom | 303/113 TR |

Primary Examiner—Matthew C. Graham
Attorney, Agent, or Firm—Larry J. Palguta; Ken C. Decker

[57] ABSTRACT

The invention concerns a vacuum-type booster comprising a case divided internally into a vacuum chamber and a working chamber by a piston comprising a valve mechanism possessing a double valve (20) enabling, in the rest postion, a communication between the two chambers which are then isolated from the environment and, in the working position, an isolation of the vacuum chamber and a communication between the working chamber and the environment at atmospheric pressure, this valve mechanism being normally controlled by an actuating rod (12) extending out of the case. According to the invention, it comprises, in addition, an electromechanical device (50, 52, 54) for controlling the valve mechanism independent of the actuating rod (12).

6 Claims, 1 Drawing Sheet

VACUUM BOOSTER WITH ELECTROMAGNETIC VALVE CONTROL

BACKGROUND OF THE INVENTION

The present invention concerns vacuum-type boosters intended, especially, to assist the braking of motor vehicles.

These boosters function perfectly well and have been known to persons skilled in the art for a long time. Such a booster is, for example, described in U.S. Pat. No. A-4,756,232. No complete description of such a booster or of its method of operation will therefore be recapitulated here.

Such a booster comprises a case divided internally into a vacuum chamber and a working chamber by a piston comprising a valve means possessing a double valve enabling in the rest position, a communication between the two chambers which are then isolated from the environment and, in the working position, an isolation of the vacuum chamber and a communication between the working chamber and the environment at atmospheric pressure. The valve means is normally controlled by means of an actuating rod extending out of the case.

Due to the sophistication of certain systems, it may be desirable to control the valve means independently of the actuating rod. In the application to brake boosting for vehicles, especially, it may be desirable to provide automatic braking independently of the driver's will, for example to provide braking of a wheel tending to spin, or in response to the detection of an obstacle by any means of the onboard radar type.

From U.S. Pat. No. A-4,608,825, it is known a brake arrangement for automatically applying the brakes when the driver leaves the seat of the vehicle. The operating shaft has a passageway therein defining a valve seat for providing a communication with air controlled by a solenoid valve member. However this brake system requires many modifications to the booster system.

SUMMARY OF THE INVENTION

According to the invention, the booster comprises in addition a means for the electromechanical control of the valve means independent of the actuating rod. Preferably, the electromechanical means consists of an electromagnet able to move a ring forming one of the seats of the double valve. The electromagnet may, for example, act on this ring via a soft iron sleeve and a preferably digitate pushrod.

BRIEF DESCRIPTION OF THE DRAWINGS

The invention will now be described by way of example with reference to the accompanying drawings in which.

DETAILED DESCRIPTION OF THE INVENTION

Figure 1:
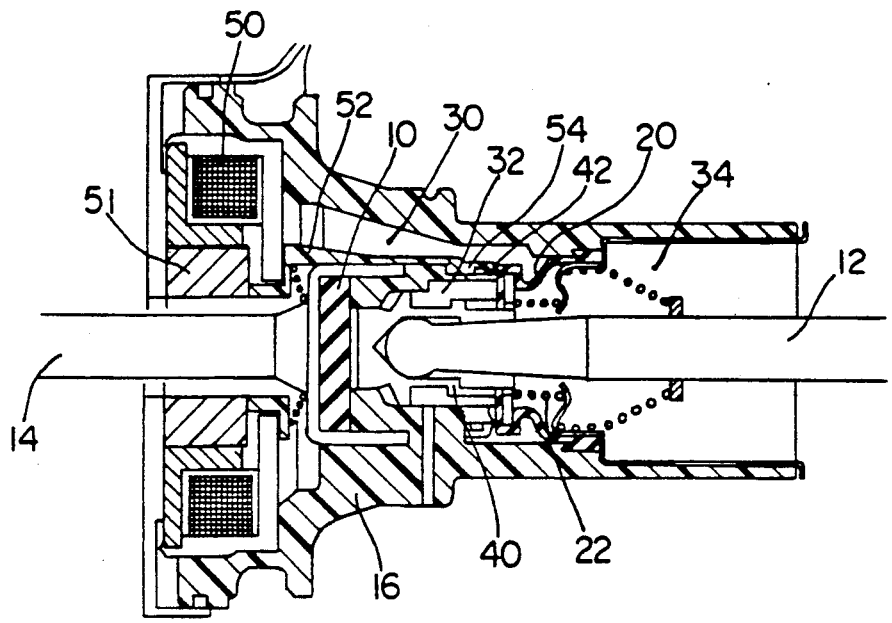
FIGS. 1 and 2 schematically represent in section two preferred methods of embodying the invention.

Now referring to these figures, a person skilled in the art will easily recognize the reaction disk 10 placed between the actuating rod 12 and the pushrod 14 in the hub 16 of the piston. The valve means comprises a double valve 20 in elastic material fitted with its push spring 22.

In the figures, the booster has been shown in the rest position. Thus, in this position, the valve means provides a communication between the two working chambers and the isolation of the assembly with respect to the environment. To this end, the passage 30 is connected to the vacuum chamber in which a sufficient vacuum is permanently created, whereas the passage 32 is connected to the variable-pressure working chamber because it is able to be connected to the exterior and to receive the atmospheric pressure prevailing in the rear zone 34 of the booster, the difference between the pressures prevailing in the two chambers constituting the driving force of the piston.

Therefore, at rest, the double valve 20 closes the communication between the rear zone 34 and the passage 32 by resting on a seat 40, whereas in the working position the valve 20 first closes the communication between the passages 30 and 32 by bearing on the seat 42, then opens the communication between the rear zone 34 and the passage 32 by virtue of the movement of the seat 40 with respect to the seat 42.

An electromagnet coil 50 is positioned in a fixed manner with respect to the piston and acts on a sleeve 51, for example of soft iron, in order to move a ring forming one of the seats of the valve 20 by means of a pushrod 52, for example of non-magnetic steel.

In the example illustrated in FIG. 1, the ring 54 itself constitutes the seat 42 positioned between the passages 30 and 32. The pushrod 52 is preferably digitate to comprise a plurality of finger-like elements as shown. Thus, when a current is applied to the electromagnet, the sleeve 51 acts on the pushrod 52, which moves in opposition to a return spring (not shown in FIG. 1) and moves the ring 54 to isolate the two chambers by closing the communication between the passages 30, 32.

A supplementary movement of the ring 54 now against the additional force of the valve spring 22 moves the valve and opens the communication between the passage 32 and the rear zone 34. A pressure difference is thus established between the two chambers and the piston becomes a motive force.

Figure 2:
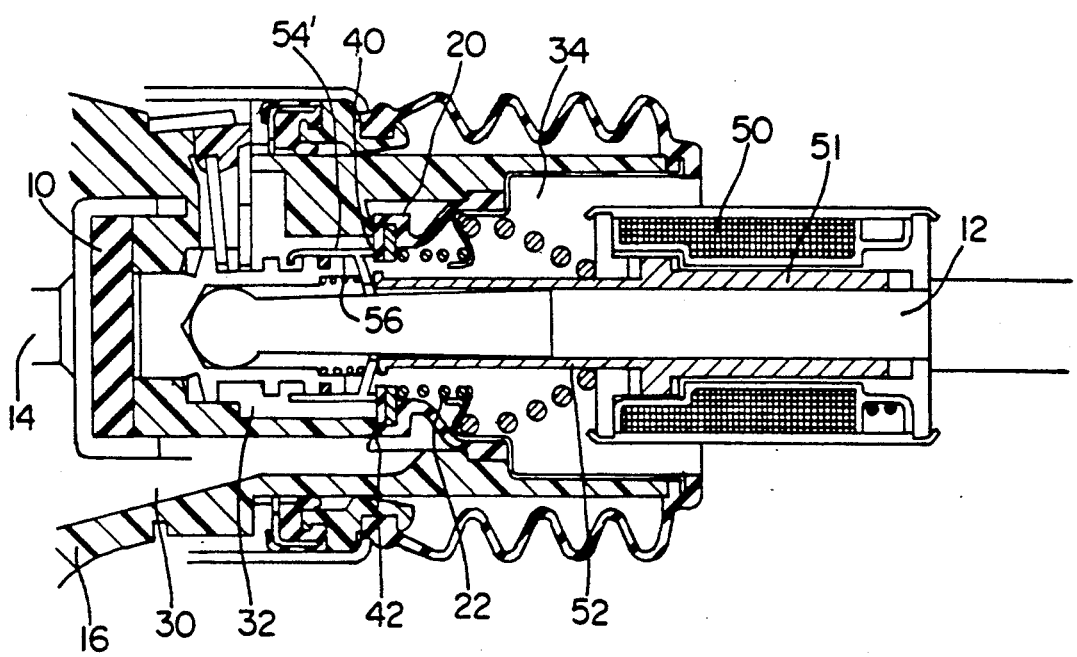

In the example illustrated in FIG. 2, the ring 54' constitutes the seat 40 of the valve 20 isolating the two chambers, in the rest position, from the environment. When a current is applied to the electromagnet, the sleeve 51 acts on the pushrod 52, which moves in opposition to a return spring 56 of sufficient rigidity to oppose in the rest position the valve spring 22, and moves the ring 54'. The valve spring 22 thus tends to press the valve onto the seat 42 to close the communication between the passages 30, 32 and a supplementary movement of the ring 54' tends to open the communication between the rear zone 34 and the passage 32 to make the piston a motive force as previously described.

A person skilled in the art will have understood that the movement of the ring 54, 54' may in a favorable manner be limited by means of stops, and a sealing ring will be placed in an appropriate manner to prevent any leaks.

Although only two embodiments of the invention have been described and shown, it is evident that a person skilled in the art will be able to apply numerous modifications to the invention without thereby leaving the scope of the invention as defined by the annexed claims.

What we claim is:

1. A vacuum-type booster, comprising a case divided internally into a vacuum chamber and a working chamber by a piston comprising valve means having a double valve provided with first and second seats and enabling, in a rest position, a communication between the chambers which are then isolated from environment and, in a working position, an isolation of the vacuum chamber and a communication between the working chamber and the environment at atmospheric pressure, said valve means being normally controlled by means of an actuating rod extending out of said case, said booster further comprising electromechanical means for controlling movement of said valve means independently of said actuating rod which remains stationary during activation of said electromechanical means and consisting of an electromagnet which moves a ring forming said first seat of the double valve.

2. The booster according to claim 1, wherein the double valve bears on said first seat in the rest position.

3. The booster according to claim 1, wherein the double valve comes to rest on said first seat in the working position.

4. The booster according to claim 1, wherein said electromagnet displaces said ring via a soft iron sleeve.

5. The booster according to claim 4, wherein the displacement of said sleeve is transmitted to said ring via a pushrod.

6. The booster according to claim 5, wherein said pushrod comprises a plurality of finger-like elements.

* * * * *